United States Patent [19]

Yoshida et al.

[11] Patent Number: 4,901,168
[45] Date of Patent: Feb. 13, 1990

[54] APPARATUS AND METHOD FOR RECORDING AND REPRODUCING A DIGITAL SIGNAL

[75] Inventors: Shiro Yoshida; Tatsuro Shirai; Satoru Nagashima, all of Maebashi, Japan

[73] Assignee: Victor Company of Japan, Ltd., Yokohama, Japan

[21] Appl. No.: 180,059

[22] Filed: Apr. 11, 1988

[30] Foreign Application Priority Data

Apr. 9, 1987 [JP] Japan .................................. 62-87515

[51] Int. Cl.[4] .......................................... G11B 15/04
[52] U.S. Cl. .................................................... 360/60
[58] Field of Search ...................... 369/59; 360/32, 60; 380/4, 22

[56] References Cited

FOREIGN PATENT DOCUMENTS

0084441 7/1983 European Pat. Off. .............. 360/60
0105241 4/1984 European Pat. Off. .............. 360/60

Primary Examiner—Vincent P. Canney
Attorney, Agent, or Firm—Fleit, Jacobson, Cohn, Price, Holman & Stern

[57] ABSTRACT

A digital signal recording and reproducing apparatus for recording an input digital signal on a recording medium to reproduce it therefrom, comprising first means for recording the same identification code as an identification number particular to the digital signal recording and reproducing apparatus when the input digital signal has a specified sampling frequency at the time of recording, and second means for reproducing the recorded identification code at the time of reproduction, thus permitting the digital signal recorded on the recording medium to be reproduced only when the reproduced identification code is coincident with the identification number particular to the apparatus.

4 Claims, 6 Drawing Sheets

PCM-ID

| W1 (PCM-ID) | | | W2 (BLOCK ADDRESS) | | | |
|---|---|---|---|---|---|---|
| ID-1 | ID-2 | FRAME ADDRESS | 0 X X X X | 0 | 0 | 0 |
| OPTIONAL CODE | | | 0 ↑ | 0 | 0 | 1 |
| ID-3 | ID-4 | FRAME ADDRESS | 0 ↑ | 0 | 1 | 0 |
| OPTIONAL CODE | | | 0 ↑ | 0 | 1 | 1 |
| ID-5 | ID-6 | FRAME ADDRESS | 0 ↑ | 1 | 0 | 0 |
| OPTIONAL CODE | | | 0 ↑ | 1 | 0 | 1 |
| ID-7 | ID-8 | FRAME ADDRESS | 0 ↑ | 1 | 1 | 0 |
| OPTIONAL CODE | | | 0 ↑ | 1 | 1 | 1 |

MSB            LSB   MSB              LSB

FIG. 5

OPTIONAL CODE

| WORD NAME | OPTIONAL CODE (W1) | | | BLOCK ADDRESS (W2) |
|---|---|---|---|---|
| SC1 | AREA FLAG | PROGRAM NO. (PNO) | | 0 X X X 0 0 0 1 |
| SC2 | INDEX | START FLAG | HOUR (ABSOLUTE TIME) | 0 ↑ 0 0 1 1 |
| SC3 | HOUR (LOWER) | MIN. (ABSOLUTE TIME) | | 0 ↑ 0 1 0 1 |
| SC4 | MIN. (LOWER) | SEC. (ABSOLUTE TIME) | | 0 ↑ 0 1 1 1 |
| AC1 | ITEM | DATA N1 | | 0 ↑ 1 0 0 1 |
| AC2 | DATA N2 | DATA N3 | | 0 ↑ 1 0 1 1 |
| AC3 | DATA N4 | DATA N5 | | 0 ↑ 1 1 0 1 |
| AC4 | DATA N6 | PARITY P | | 0 ↑ 1 1 1 1 |

MSB                       LSB

FIG. 6

AC ( AUXILIARY CODE )

| ITEM | MODE |
| --- | --- |
| 0 0 0 0 | NO INFORMATION |
| 0 0 0 1 | ABSOLUTE TIME |
| 0 0 1 0 | PROGRAM TIME |
| 0 0 1 1 | INDEX TIME |
| 0 1 0 0 | PNO, INDEX & FLAGS |
| 0 1 0 1 | RESERVED |
| 0 1 1 0 | CALENDAR - 1 |
| 0 1 1 1 | CALENDAR - 2 |
| 1 0 0 0 | TOC - 1 |
| 1 0 0 1 | TOC - 2 |
| 1 0 1 0 | CATALOG NUMBER - 1 |
| 1 0 1 1 | CATALOG NUMBER - 2 |
| 1 1 0 0 | ISRC - 1 |
| 1 1 0 1 | ISRC - 2 |
| 1 1 1 0 | ISRC - 3 |
| 1 1 1 1 | SOFT MODE |

FIG. 7

APPARATUS AND METHOD FOR RECORDING AND REPRODUCING A DIGITAL SIGNAL

BACKGROUND OF THE INVENTION

This invention relates to an apparatus for recording and reproducing a digital signal, and more particularly to an apparatus for recording and reproducing a digital signal which is so adapted that, when an input digital signal is recorded onto a recording medium and is reproduced therefrom, reproduction is permitted with the apparatus with which the input digital signal was recorded, but reproduction is impossible with a recording and reproducing apparatus or a reproducing apparatus except for the above recorded apparatus.

In a DAT (Digital Audio Tape Recorder) using a rotary head among DATs capable of recording pulse code modulated sound data, obtained by applying pulse code modulation (PCM) to an analog audio signal, on a magnetic tape and reproducing the PCM sound data therefrom, a magnetization pattern to be recorded on the magnetic tape is recorded with azimuth angles of adjacent tracks being different from each other and with guard bands between tracks being absent. In such a DAT, subcodes are recorded on a track portion a fixed period from the initial end of each track and on a track portion a fixed period immediately before the terminating end thereof, respectively, and PCM signal data are recorded on the track intermediate portion except for the above-noted track portions in accordance with a predetermined format. The data thus recorded are reproduced.

CDs (Compact Disks) on which PCM sound data (digital signals) are recorded have been widely used. When the PCM sound data reproduced from the CD is recorded onto a magnetic tape with it being in the form of the digital signal, by means of, e.g., the above-mentioned DAT using a rotary head, high quality sound free from degradation of the sound quality can be recorded.

Meanwhile, where information (software) such as music recorded on CDs are recorded onto the magnetic tape, such a recording is permitted in accordance with the requirement of the Copyright Law only in connection with the case where individuals enjoy recorded information. On the other hand, when information (digital signals) recorded on CDs are recorded onto the magnetic tape in the form of a digital signal by means of DAT as stated above (which is so called a "digital copy" hereinafter), high quality sound free from degradation of the sound quality can be recorded. Accordingly, a large number of magnetic tapes digitally copied from a CD may be obtained. This is becoming a large problem from a viewpoint of the Copyright Law.

Thus, a copy guard system for preventing a large number of magnetic tapes from being digitally copied from CDs is highly desirable.

SUMMARY OF THE INVENTION

In view of the above-mentioned prior art, an object of this invention is to provide an apparatus for recording and reproducing a digital signal, which is adapted so that when a input digital signal is recorded onto a recording medium and is reproduced therefrom, reproduction is solely permitted with the apparatus used for this recording, but reproduction is impossible with another recording and reproducing apparatus or a reproducing apparatus except for the recording apparatus originally used.

To achieve the above object, this invention provides an apparatus for recording and reproducing a digital signal, to record an input digital signal on a recording medium and to reproduce it therefrom, which apparatus comprises means for recording on a recording medium the same identification code as a number particular to the apparatus used for recording and reproducing the digital signal when the input digital signal has a specified sampling frequency at the time of recording, and means for reproducing the recorded identification code when a reproduced digital signal has the specified sampling frequency at the time of reproduction, thus permitting the digital signal recorded on the recording medium to be reproduced only when the reproduced identification code is coincident with the specific apparatus identification number.

DESCRIPTION OF PREFERRED EMBODIMENT

This invention is directed to a digital signal recording/reproducing apparatus which permits a magnetic tape on which a digital signal reproduced from a CD, etc. is recorded using, e.g., DAT, to be reproduced as long as an individual enjoys it.

In this embodiment, it is assumed that a plurality of DAT equipments $S_1, S_2, \ldots, S_n$ permit recording of digital signals reproduced (digital copy) from a CD, etc., respectively.

It is now assumed that magnetic tapes on which digital signals from a CD, etc. are recorded (digitally copied) using respective DAT equipments are represented by $T_1, T_2, \ldots, T_n$, respectively. In this case, an arbitrary magnetic tape Ti taken out from these tapes is adapted so that when an attempt is made to reproduce it using an arbitrary DAT equipment Sj ($i \neq j$) thereamong, a reproduced output signal is subjected to muting, and one cannot listen to any sound. As long as the condition of $i=j$ holds, i.e., as long as an owner of the DAT equipment Si reproduces the magnetic tape Ti recorded by the specific DAT equipment Si using his/her own DAT equipment Si, the muting is released, whereby one can listen to sound.

To realize the above function, it is required to go through the following process.

① Identification numbers particular to respective DAT equipments are assigned or allocated thereto, respectively (Such numbers are individually determined by manufacturers). For instance, in the case of allocating numbers of No. 1 to No. n to identification numbers particular to p·n DAT equipments, respectively, P·DAT equipments of the same number exist. For realizing it as an actual electric circuit, a non-volatile memory or a switch is used, thereby to memorize such numbers. If 16 bits can be represented, different numbers can be allocated to $2^{16}$ DAT equipments.

② It is assumed that a CD having a sampling frequency fs of 44.1 KHz and that the number of quantization bits used is 16 bits. In the case of digitally copying a digital signal from the CD of fs=44.1 KHz to the DAT equipment Si, the same identification code I as the specific identification number i allocated to the DAT equipment Si is recorded on a specified item {e.g., "Reserved item" or "Catalog item"} of the PCM-ID in magnetization pattern (a predetermined format which will be described later) recorded on the magnetic tape.

It is to be noted that in the case of the "Catalog item", it is required to use together a sensing hole (Recognition hole) provided in a magnetic tape cassette for identifying or discriminating whether or not the tape is a commercially available pre-recorded tape (hereinafter simply called a pre-recorded tape).

This can be controlled by a microcomputer as described later.

The reason why the identification code I is recorded on the PCM-ID is that the PCM-ID is difficult to carry out after recording (Actually, after-recording of the PCM-ID is not carried out). In contrast, the subcode ID may be reproduced by carrying out after-recording.

③ In the case of reproduction, as long as the sampling frequency fs is 44.1 KHz, the identification code recorded on the specified item of the PCM-ID in the above-mentioned item ② is reproduced, and comparison between the reproduced identification code and the specific identification number allocated to the DAT equipment is made. As a result, when they are coincident with each other, muting is not effected. In contrast, when they are not coincident with each other, muting is effected so that the sound is unable to be listened to.

It is to be noted that when the "Catalog item" is used, it is required to further identify the sensing hole (Recognition hole) for discriminating whether or not the magnetic tape is a pre-recorded tape, and when it is discriminated a pre-recorded tape as a result of this discrimination, the processings subsequent to the procedure for reproducing the above-mentioned identification code will not be executed.

The magnetization pattern (format) recorded on the magnetic tape will be now explained.

Figure 3:
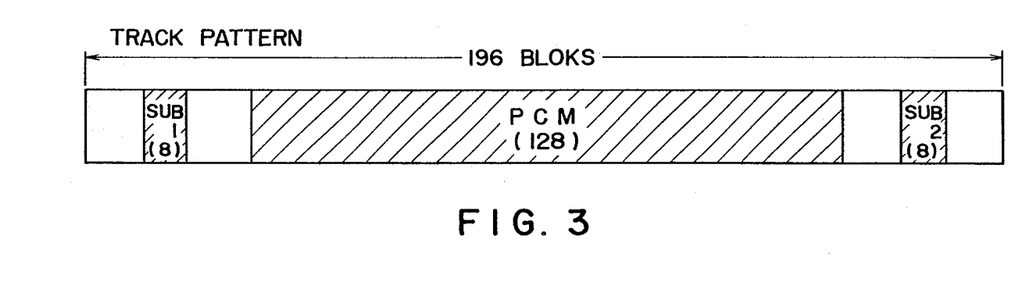
FIGS. 3 to 7 are explanatory views showing the format of a digital signal recorded and reproduced in the embodiment according to this invention.

FIG. 3 is an explanatory view showing a single track pattern formed in a slanting manner on the magnetic tape. This single track pattern is composed of 196 blocks wherein subcodes SUB-1, 2 are recorded on a track portion a fixed period from the initial end and on a track portion a fixed period immediately before the terminating end, respectively, and PCM signal data are recorded on the track intermediate portion except for the above-noted track portions. The subcodes SUB-1, 2 are composed of 8 blocks, respectively, and the PCM signal data is composed of 128 blocks.

Figure 4:
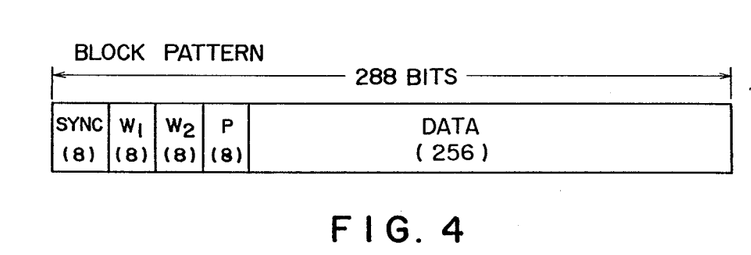

FIG. 4 is a an explanatory view showing one block pattern comprised of 288 bits. As shown, from the initial end, a synchronizing signal of 8 bits, an ID code W1 of 8 bits, a block address W2 of 8 bits, a parity P of 8 bits, and data of 256 bits are arranged in succession in the order recited.

The ID code W1 serves as "PCM-ID" in the PCM signal data PCM of the track pattern and also serves as "SUB-ID" in the subcode SUB-1 thereof.

Figure 5:
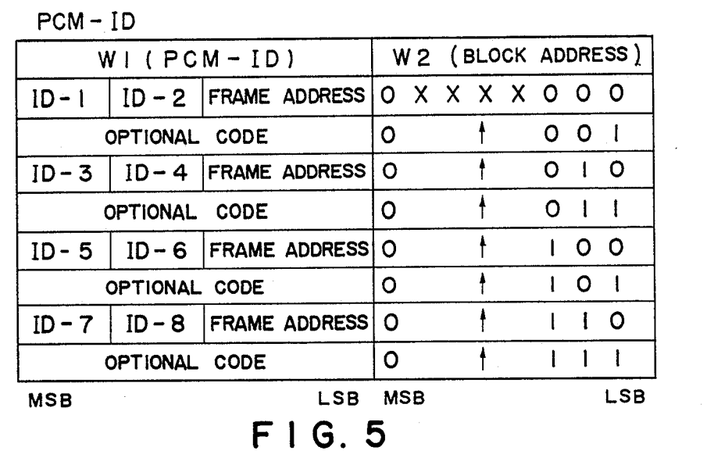

FIG. 5 is an explanatory view showing the data configuration of PCM-ID which is ID code W1, and a block address W2 in the PCM signal data PCM of the track pattern.

As shown in this figure, names are given to respective portions of the ID code W1 in correspondence with the value of the lower order 3 bits of the block address W2. Moreover ID-1 to ID-8 are indispensable data which are called "MUST items". In addition, at odd block addresses, in the ID code W1 (PCM-ID) in correspondence with the value of the lower order 4 bits of the block address W2, an optional code is constituted in accordance with a format as shown in FIG. 6.

Figure 6:
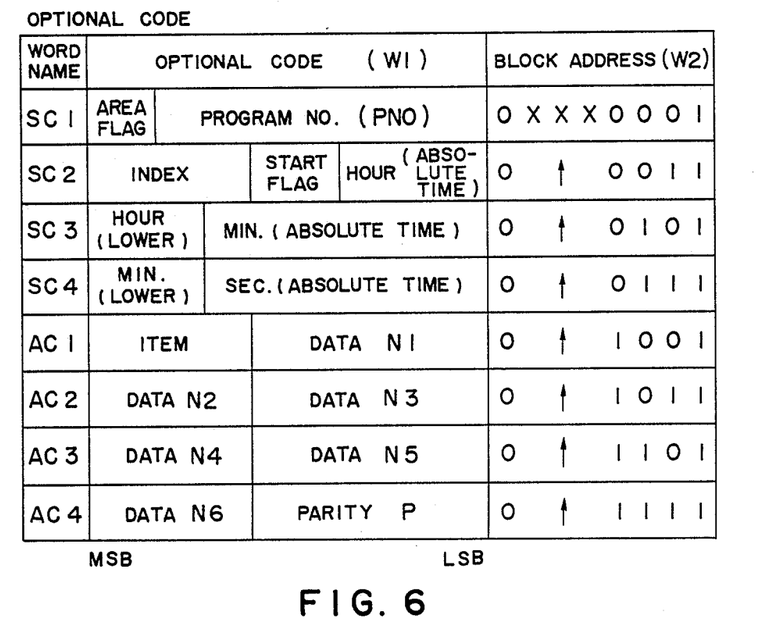

As shown in FIG. 6, the optional code is comprised of search codes SC1 to SC4 and auxiliary codes AC1 to AC4. Further, the higher order 4 bits of the auxiliary code AC1 is allocated to an item. In addition, the lower order 4 bits of the auxiliary code AC1, and the higher order and lower order 4 bits of the auxiliary codes AC2 to AC4 are allocated to data N1 to N6 and parity P, respectively.

The data N1 to N6 are represented by numeric values of 24 bits and the parity P is expressed as follows:

$$P = N1 \oplus N2 \oplus \ldots \oplus N6$$

where $\oplus$ represents MOD2 (i.e. "modulo 2").

Figure 7:
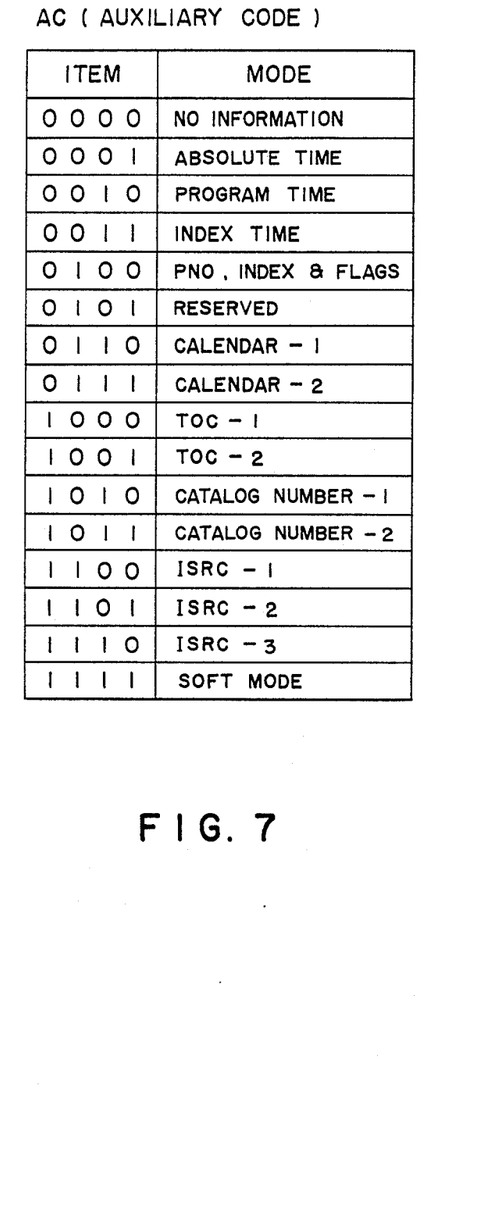

FIG. 7 is an explanatory view showing the configuration of the item of the auxiliary code AC1.

In this embodiment, the same identification codes I as the specific identification number i allocated to the DAT equipment Si are recorded on the data N1 to N6 and their parity is recorded as the specified item {e.g., "Reserved item" or "Catalog item"} of the auxiliary code AC1 (FIG. 7) of the optional code (FIG. 6) of the PCM-ID (FIG. 5) in the above-mentioned track pattern (format) recorded on the magnetic tape.

Figure 1:
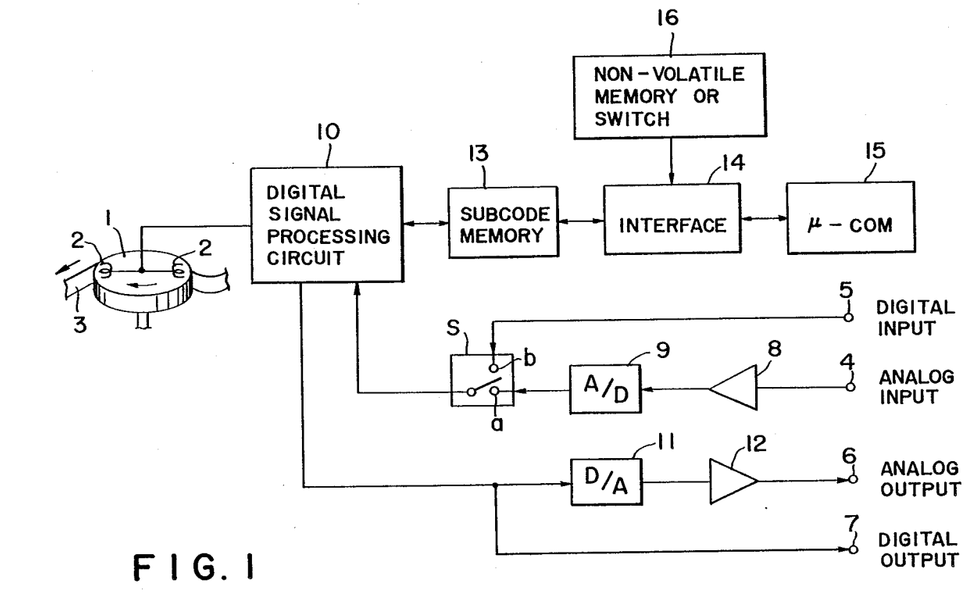
FIG. 1 is a block diagram showing a circuit configuration of an apparatus according to this invention.

FIG. 1 is a block diagram showing an embodiment of an apparatus for recording and reproducing a digital signal.

As shown in this figure, on the revolving surface of rotary drum 1, a set of rotary heads 2 and 2 are affixed at positions opposite to each other on the rotary drum 1.

A magnetic tape 3 is, e.g., 3.81 mm wide and is wound onto the rotary drum 1 with it being obliquely contact therewith over an angular range of 90 degrees with respect to the rotary drum 1. The magnetic tape 3 is caused to run in a direction indicated by an arrow with it being tightly supported by a capstan and a pinch roller (which are not shown).

The set of rotary heads 2 and 2 have gaps of which the azimuth angles are opposite to each other. They have a track width broader (e.g. 1.5 times) than that of the recording track and are revolved integrally with the rotary drum 1.

This digital signal recording/reproducing apparatus is provided with an analog input terminal 4 to which an analog audio signal is input, a digital input terminal 5 to which a digital audio signal reproduced from a CD, etc. is input, an analog output terminal 6 from which an analog audio signal is output, and a digital output terminal 7 from which a digital audio signal is output.

At the time of recording, an analog audio input signal from the input terminal 4 is delivered to a digital signal processing circuit 10 through an amplifier 8 and an A/D converter 9 and through the terminal a of a changeover switch S. In addition, a digital audio input signal from the input terminal 5 is also delivered to the digital signal processing circuit 10 through the terminal b of the changeover switch S.

On the other hand, at the time of reproduction, a digital signal output from the digital signal processing circuit 10 is changed to an analog signal by a D/A converter 11 and the analog signal thus obtained is then output as an analog audio signal to the output terminal 6 through an amplifier 12. The same digital signal as stated above which is output from the digital signal processing circuit 10 is directly output to the output terminal 7 as a digital audio signal.

The digital signal recording/reproducing apparatus further comprises a subcode memory 13, an interface 14, a microcomputer 15, and a non-volatile memory or switch 16.

It is to be noted that in the same manner as in the definition of the DAT standard agreed upon in the industry, "Subcode" includes not only the subcodes recorded on the subcode areas SUB-1, 2, but also the PCM-ID recorded on the PCM area in this specification. Subcodes including the PCM-ID to be recorded or reproduced are memorized into the subcode memory 13.

The digital signal processing circuit 10 adds error correcting codes C1 and C2 (both of which are read-solomon code) to a digital signal delivered through the A/D converter 9 at the time of recording, or a digital audio signal (including at least two channel data of Right and Left) reproduced from a CD, etc. delivered from the input terminal 5 to generate PCM data, and adds the error correcting code C1 to a portion of the data sent from the subcode memory 13 and adds an error detection simple parity code to the remaining portion thereof. After these PCM audio data and subcode data are formatted so as to have forms allocated thereto, respectively, these formatted data are subjected to modulation (8 to 10 conversion) so as to have a form with which it is easy to effect data transmission. Automatic Track Finding (ATF) signals are added thereto, thus to generate a digital signal for recording onto the magnetic tape 3 which is then delivered to the rotary heads 2 and 2.

Further, at the time of reproduction, the digital signal processing circuit 10 takes out a signal reproduced from the magnetic tape 3 to perform thereon an error correction, thus to generate a digital audio signal. On the other hand, this circuit 10 performs an error correction on a portion of subcodes SUB-1, 2 on the subcode areas and PCM-ID on the PCM area of the magnetic tape 3 and carries out an error detection on the remaining portion thereof, thus to write corrected data into the subcode memory 13.

The subcode memory 13 serves to store data of the subcode. At the time of recording, the signal flows via the microcomputer 15, the interface 14, the subcode memory 13, and the digital signal processing circuit 10. In contrast, at the time of reproduction, the signal flows in an opposite direction via the digital signal processing circuit 10, the subcode memory 13, the interface 14, and the microcomputer 15.

The interface 14 is a circuit for effecting reception and transmission of data among the microcomputer 15, the subcode memory 13, and the non-volatile memory or switch 16.

The non-volatile memory or switch 16 is a memory or a switch for memorizing a specific identification number allocated to the DAT equipment concerned.

Figure 1A:
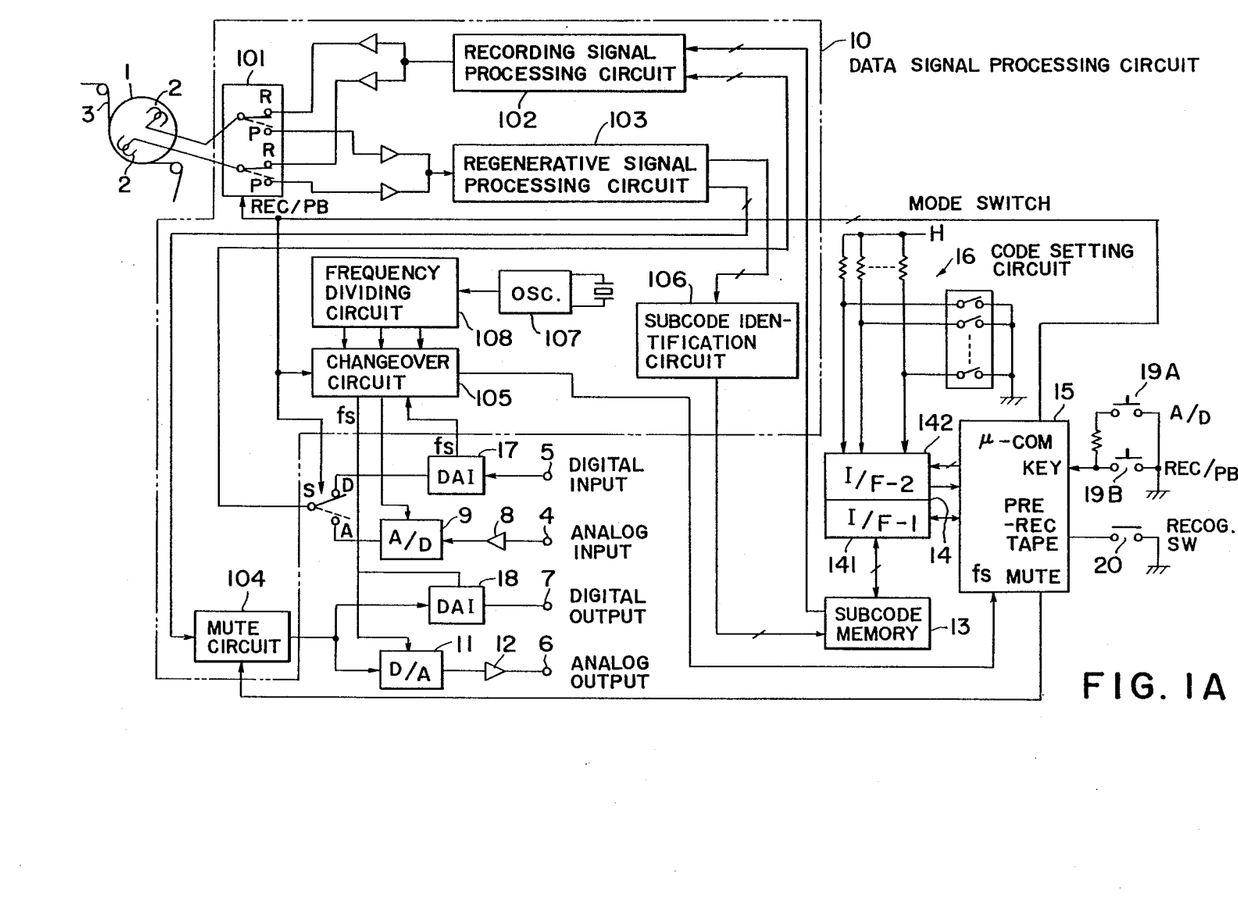
FIG. 1A is a block diagram showing the detail of the circuit configuration in FIG. 1.

FIG. 1A is a block diagram showing the detail of the circuit in FIG. 1. This circuit has a configuration different in part from that in FIG. 1.

The data processing circuit 10 comprises, in the same manner as in the ordinary DAT equipment, a circuit element or component for delivering an input from the digital input 5 or the analog input 4 to the magnetic head 2 to record it therewith and a circuit component for producing a signal taken out from the magnetic head 2 on the digital output 7 or the analog output 6 as a reproduced output signal.

For the recording element thereof, a recording signal processing circuit 102 is provided. This circuit 102 applies interleave or addition or error detecting/correcting code, etc. to the PCM audio signal to add a subcode from the subcode memory 13 thereto, thereafter to deliver the signal thus obtained to the magnetic tape 2 through an amplifier and a mode changeover switch 101.

In addition, for the reproducing element, a regenerative signal processing circuit 103, a subcode identification circuit 106, and a mute circuit 104 are provided. PCM data in the signal reproduced by the magnetic head 2 is subjected to error detection/correction by the regenerative signal processing circuit 103 and the data thus processed is delivered to the mute circuit 104. In addition, the subcode signal in the reproduced signal is delivered to the subcode identification circuit 106, at which the kind of the subcode is identified. The subcode signal thus identified is stored at a predetermined address in the subcode memory 13 allocated in advance in correspondence with the kind of subcode identified.

The microcomputer (which will be simply called a "$\mu$-com" hereinafter) 15 reads the reproduced subcode stored in the subcode memory 13 through a section 141 (I/F-1) of the interface 14 according to need, thus to display reproducing mode, program number, and performance elapsed time, etc. on a display (not shown).

When the apparatus is in a recording mode, when the running speed has not reached a predetermined value immediately after the reproducing mode, or when an error or uncorrectable data occur in succession in the PCM data reproduced and de-interleaved, a mute signal is delivered from the $\mu$-com 15 to the mute circuit 104, thus to mute off an output signal.

Further, for an element or component used at the time of recording and reproducing, a changeover circuit 105 operated by a mode switch signal from the $\mu$-com 15 is provided. When the recording input is a digital input, this changeover circuit 15 detects a sampling frequency from the DAI 17 to deliver the signal detected to the $\mu$-com 15. In addition, at the time of recording and reproduction of an analog input, this changeover circuit 105 selects and switches a sampling frequency according to the mode from a plurality of sampling signals obtained by frequency-dividing a signal from an oscillator 107 using a frequency-dividing circuit 108, thus to deliver it to the A/D converter 9 or to the DAI (digital audio interface) 18 and the D/A converter 11. DAIs 17 and 18 in FIG. 1A are not provided in the circuit configuration in FIG. 1, and are constituted in accordance with EIAJ standard, CP-340, Digital Audio Interface (instituted Sept., 1987).

This digital signal processing circuit 10 is controlled by the $\mu$-com 15. The $\mu$-com 15 responds to, as a key input, an analog/digital input switch command from a push-button switch 19A and a recording/reproducing switch command from another push button switch 19B to carry out a determination of mode by a level judgement. Further, the $\mu$-com 15 makes a judgement whether the magnetic tape is a pre-recorded tape on the basis of an input from the Recognition switch 20. This Recognition switch 20 is automatically opened and closed in dependence upon whether or not a recognition hole for a pre-recorded tape is provided at a predetermined portion of the tape cassette loaded on the DAT equipment.

The elements or components in FIG. 1A and the operations thereof which have been described above are the same as those in the conventional DAT equipment. In this embodiment, a code setting circuit 16 and an interface section or unit 142 (I/F-2) are newly added and the program in the μ-com 15 is altered. The operation of the portions added and altered will be now described.

The code setting circuit 16 is comprised of a plurality of switches accommodated in a portion of the apparatus where a user is unable to readily gain access, and a plurality of registers. One terminal of each switch is grounded and the other terminal thereof is connected to a high voltage power supply and to the interface unit 142. Switches combined in correspondence with an identification code particular to the DAT equipment are set OFF. Other switches are set ON. The code setting circuit 16 deliver a high or low level signal parallelly to the interface unit 142 in dependence upon the set condition of OFF or ON of these switches.

In the case of the mode to record a digital input having a sampling frequency fs of 44.1 KHz, or in the case of the reproducing mode, the interface unit 142 receives a command (a load signal and a read clock) from the μ-com 15 to convert parallel identification code signals from the code setting circuit 16 to a serial identification code signal, thus to deliver it to the μ-com 15. In the case of the recrding mode having a sampling frequency fs of 44.1 KHz, the μ-com 15 delivers the identification code thus delivered to the memory 13 through the interface unit 141 to memorize it at a predetermined address (step 23 in FIG. 2). The μ-com 15 further delivers it to the recording signal processing circuit 104 to record it on the tape along with PCM data and other subcodes. In the case of a recording mode having a sampling frequency other than 44.1 KHz (i.e. fs≠44.1 KHz), the μ-com 15 resets (clears) the data at the predetermined address mentioned above of the subcode memory 13 (step 25).

In the case of the reproducing mode, the μ-com 15 reads data at the predetermined address of the subcode memory 13 through the interface unit 141 to judge whether or not an identification code is present thereat (step 28). As a result, when the identification code is present, this code is compared with an identification code obtained from the code setting circuit 16 through the interface unit 142 (step 29).

Figure 2:
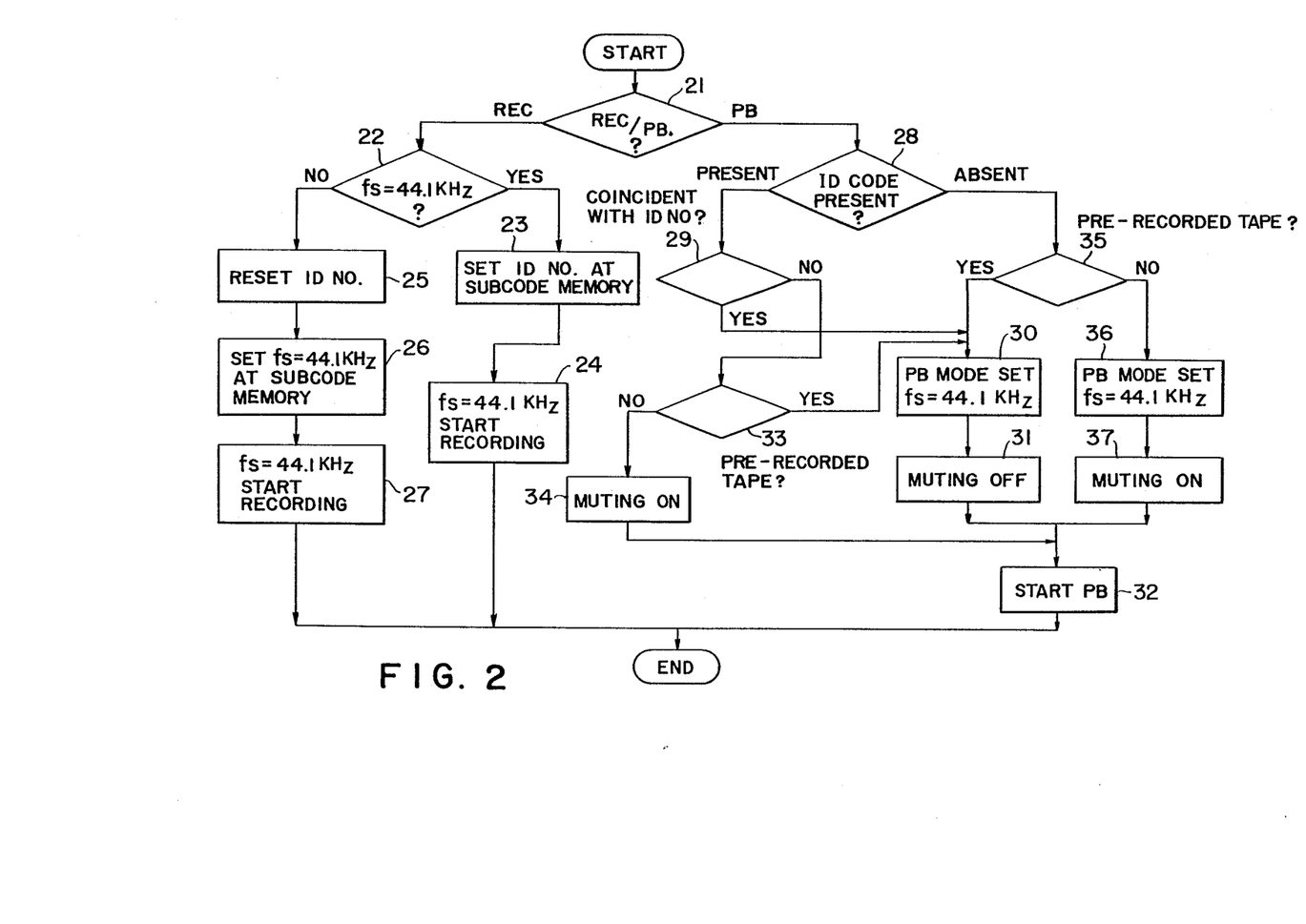
FIG. 2 is a flowchart for explanation of the operation of an embodiment according to this invention.

The μ-com 15 is programmed so that it makes a judgement in accordance with the flowchart shown in FIG. 2, or controls respective elements. Since the operations at respective steps are the same as those in ordinary DAT equipment and the whole operation becomes apparent from the flowchart in FIG. 2, further explanation in regard to FIG. 1A will be omitted.

The operation of the digital signal recording/reproducing apparatus thus constituted will be explained with reference to FIG. 2.

First, judgement as to whether the apparatus is in a recording or reproducing (playback) mode is made (step 21). In the recording mode, judgement as to whether or not the sampling frequency fs is 44.1 KHz is made (step 22). As a result, when it is 44.1 KHz [YES], the same identification code as the specific identification number allocated to the DAT equipment concerned is set at the subcode memory 13 (step 23). Then, the sampling frequency fs is allowed to be equal to 44.1 KHz to start recording (step 24).

In contrast, when the sampling frequency of the input digital signal is not 44.1 KHz [NO], the identification code is reset (step 25). Then, a sampling frequency fs other than 44.1 KHz is set at the subcode memory 13 (step 26). Then, the sampling frequency fs is allowed to be equal to a value other than 44.1 KHz to start recording (step 27).

On the other hand, at the time of reproduction or playback, judgement as to whether or not an identification code in the reproduced signal is present is made (step 28). As a result, when the identification code is present [YES], judgement as to whether that identification code is coincident with the own identification number allocated to the DAT equipment concerned is made (step 29). As a result, when both are coincident with each other [YES], the sampling frequency fs is set to 44.1 KHz (step 30). Then, muting is turned off (step 31) to start reproduction or playback (step 32).

In contrast, when both are not coincident with each other [NO], discrimination as to whether or not the magnetic tape is a pre-recorded tape is made by the presence or absence of a detection hole (Recognition hole) provided in the magnetic tape cassette (step 33). As a result, when the mangetic tape is judged to be a pre-recorded tape [YES], the program execution shifts to the above-mentioned step 30. In contrast, when the magnetic tape is judged not to be a pre-recorded tape [NO], muting is turned on (step 34). Thus, the program execution shifts to the above-mentioned step 32.

On the other hand, when the identification code is absent at the step 28 [NO], discrimination as to whether the magnetic tape is a pre-recorded tape by the presence or absence of a detection hole (Recognition hole) provided in the magnetic tape cassette is made in the same manner as in the step 33 (step 35). As a result, when the magnetic tape is judged to be a prerecorded tape [YES], the progam execution shifts to the step 30. In contrast, when the magnetic tape is judged not to be a pre-recorded tape [NO], the sampling frequency is set to a value other than 44.1 KHz (step 36) to turn on muting (step 37). Thus, the program execution shifts to the above-mentioned step 32.

Since the above-mentioned digital signal processing for the identification code is carried out by the microcomputer, where parity adding and checking of the identification code are an overload on the computer, in place of parity of identification code using the equation expressed as $P=N1 \oplus N2 \oplus \ldots \oplus N6$, data corresponding thereto may be stored. Also in this case, since parity of the PCM-ID using the equation expressed as $P=W1 \oplus W2$ is carried out by the microcomputer, only each value judged to be OK among respective numeric values of the above-mentioned AC is written into the subcode memory. Accordingly, it can be said that protection of data is actually effective. In addition, since there may be employed a method such that where identification codes which have been read several times are considered to be the same at a rate of 100%, such discrimination codes are judged to be correctly reproduced, thus to utilize the result thereof.

As described above in detail, an apparatus for recording and reproducing a digital signal according to this invention is adapted so that, when an input digital signal is recorded on a recording medium to reproduce it therefrom, reproduction is possible with the same apparatus on which the input digital signal was originally thus recorded, whereas reproduction is impossible with a recording/reproducing apparatus or a reproducing apparatus except for the apparatus used for the original recording. Thus, for example, while a large number of magnetic tapes digitally copied from a CD can be obtained, such large number of magnetic tapes can be reproduced only using the original recording/reproduction apparatus. This substantially permits copy guard to be effected.

What is claimed is:

1. An apparatus for recording and reproducing a digital signal, which apparatus records an input digital signal on a recording medium and reproduces therefrom digital signals recorded thereon, comprising:
    first means for recording on the recording medium an identification code being an identification number particular to said digital signal recording and reproducing apparatus only when said input digital signal has a predetermined sampling frequency at the time of recording whereby said identification code is selectively recorded on the recording medium along with said input digital signal; and
    second means for reproducing said recorded identification code at the time of reproduction of said recorded input digital signal, for thus permitting the input digital signal recorded on said recording medium to be reproduced only when the reproduced identification code is coincident with said identification number particular to said digital signal recording and reproducing apparatus.

2. An apparatus for recording and reproducing a digital signal, which apparatus records an input digital signal on a recording medium and reproduces therefrom digital signals recorded thereon, comprising:
    first means for recording on the recording medium an identification code being an identification number particular to said digital signal recording and reproducing apparatus only when said input digital signal has a predetermined sampling frequency at the time of recording whereby said identification code is selectively recorded on the recording medium along with said input digital signal; and
    second means for reproducing said recorded identification code at the time of reproduction of said recorded input digital signal, for thus permitting the input digital signal recorded on said recording medium to be reproduced only when the reproduced identification code is coincident with said identification number particular to said digital signal recording and reproducing apparatus;
    wherein said first means comprises:
        frequency detection means for detecting whether the sampling frequency of said input digital signal is a predetermined frequency;
        code formation means for forming an identification code which is the same as an identification number particular to said digital signal recording and reproducing apparatus; and
        recording means for recording the identification code from said code formation means on said recording medium when said frequency detection means detects that sampling frequency of said input digital signal is said predetermined frequency.

3. An apparatus for recording and reproducing a digital signal, which apparatus records an input digital signal on a recording medium and reproduces therefrom digital signals recorded thereon, comprising:
    first means for recording on the recording medium an identification code being an identification number particular to said digital signal recording and reproducing apparatus only when said input digital signal has a predetermined sampling frequency at the time of recording whereby said identification code is selectively recorded on the recording medium alloy with said input digital signal; and
    second means for reproducing said recorded identification code at the time of reproduction of said recorded input digital signal, for thus permitting the input digital signal recorded on said recording medium to be reproduced only when the reproduced identification code is coincident with said identification number particular to said digital signal recording and reproducing apparatus;
    wherein said second means comprises:
        code reproducing means for reproducing an identification code from the reproduced digital signal;
        code formation means for forming an identification code which is the same as an identification number particular to said digital signal recording and reproducing apparatus; and
        coincidence detection means for detecting whether the identification code from said code reproducing means coincides with the identification code from said code formation means, for thereby enabling reproduction of said recorded digital signal when coincidence is detected between said respective identification codes.

4. An apparatus for recording and reproducing a digital signal, in which an input digital signal is recorded on a recording medium and the recorded signal is reproduced therefrom,
    wherein, only when said input digital signal has a predetermined sampling frequency of recording said input digital signal on said recording medium, an identification code which is the same as an identification number particular to said apparatus for recording and reproducing a digital signal is recorded on said recording medium, whereby said identification code is selectively recorded on said recording medium only when the sampling frequency of the input digital signal to be recorded on said recording medium is said predetermined frequency; and
    wherein, at the time of reproduction of said recorded digital signal from said recording medium, said recorded identification code is reproduced, for thus permitting the digital signal recorded on said recording medium to be reproduced only when said reproduced identification code is coincident with said identification number particular to said digital signal recording and reproducing apparatus.

* * * * *